UNITED STATES PATENT OFFICE.

EDWARD P. REISTER, OF CENTREVILLE, IOWA, ASSIGNOR OF ONE-HALF TO GEORGE F. SEVERS, OF SAME PLACE.

INSECTICIDE.

SPECIFICATION forming part of Letters Patent No. 642,368, dated January 30, 1900.

Application filed June 2, 1899. Serial No. 719,098. (No specimens.)

*To all whom it may concern:*

Be it known that I, EDWARD P. REISTER, a citizen of the United States, residing at Centreville, in the county of Appanoose and State of Iowa, have invented certain new and useful Improvements in Compositions for Driving Off Flies from Animals and Stock; and I do hereby declare the following to be a full, clear, and exact description of the invention, such as will enable others skilled in the art to which it appertains to make and use the same.

In warm weather horses, cows, dogs, other animals, and stock generally are troubled by flies, mosquitoes, and insects and which detracts materially from their good qualities, causing a diminution of the lacteal fluid in milch cows, horses to become fractious, and domestic animals to lose their temper and become fierce and dangerous.

This invention has for its object the provision of an ointment which can be applied to the hide of animals with beneficial results and which will drive off insects and render the animals immune against their attacks.

The compound is composed of the following ingredients in about the proportions stated— *i. e.*, hog's lard, five pounds; boiled linseed-oil, one-fourth gallon; powdered sulphur, one-half pound; pulverized lime, one-half pound; London purple, three ounces; carbolic acid, two ounces; fish-oil, one pint. The foregoing ingredients are mixed, forming an ointment which is applied to the hide of the animal either by means of a brush or swab or in any convenient way. The lard forms the carrier vehicle for the other ingredients. The linseed-oil is the binding medium and holds the substances to the hide. The pulverized sulphur is a purifying agent and vermin-destroyer. The pulverized lime is ordinary lime of commerce slaked in water under cover in such a manner as to avoid excessive heat. The lime when slaked is ground to an impalpable powder. London purple is a by-product resulting from the manufacture of coloring-matters and contains arsenic as the active agent, which is a powerful insecticide. The carbolic acid and fish-oil emit an odor which is disagreeable to insect life and drive off the pests by their smell.

The compound prevents warbles in the hides of animals when applied thereto and kills any vermin lodged on the surface of the hide, as well as keeping off winged and other insects.

Having thus described the invention, what is claimed as new is—

The herein-described composition of matter consisting of hog's lard, boiled linseed-oil, powdered sulphur, pulverized lime, London purple, carbolic acid and fish-oil in about the proportions set forth.

In testimony whereof I affix my signature in presence of two witnesses.

EDWARD P. REISTER. [L. S.]

Witnesses:
J. M. WILSON,
H. E. REISTER.